United States Patent [19]

Hoersch

[11] Patent Number: 5,132,487
[45] Date of Patent: Jul. 21, 1992

[54] SUPERCONDUCTOR TRANSMISSION LINE

[76] Inventor: Robert C. Hoersch, 8211 Raintree Cir., Culver City, Calif. 90230

[21] Appl. No.: 636,692

[22] Filed: Jan. 2, 1991

Related U.S. Application Data

[63] Continuation-in-part of Ser. No. 308,565, Feb. 20, 1989, abandoned.

[51] Int. Cl.$^5$ .............. H01B 12/00; H01B 12/02; H04B 1/00; H01P 1/00
[52] U.S. Cl. .............. 174/15.5; 174/15.4; 174/125.1; 505/1; 505/856; 505/866; 505/884; 505/885; 505/886; 505/887; 505/704
[58] Field of Search ............. 174/15.4, 15.5, 125.1; 505/1, 856, 866, 884, 885, 886, 887, 704

[56] References Cited

U.S. PATENT DOCUMENTS

| | | | |
|---|---|---|---|
| 3,562,401 | 2/1971 | Long | 174/15.5 |
| 3,612,742 | 10/1971 | Snowden et al. | 174/15.5 |
| 4,039,740 | 8/1977 | Iwata | 174/15.5 |
| 4,334,123 | 6/1982 | Tada et al. | 174/15.5 |
| 4,341,924 | 7/1982 | Gleim | 174/15.5 |

Primary Examiner—Leo P. Picard
Assistant Examiner—Bot Ledynh
Attorney, Agent, or Firm—Robert M. Sperry

[57] ABSTRACT

An improved transmission system for electrical energy comprising a plurality of ball members interspersed by mating members enclosed within at least one protective outer wrapping, with the ball members and the mating members being in contact with adjacent members and being formed of material which is electrically conductive at superconductor temperatures and each having an axial opening extending therethrough to permits passage of a suitable coolant fluid, such as liquid helium.

4 Claims, 1 Drawing Sheet

SUPERCONDUCTOR TRANSMISSION LINE

RELATED DOCUMENTS

This application is a continuation-in-part of my co-pending patent application, Ser. No. 308,565, filed Feb. 20, 1989, now abandoned.

BACKGROUND

This invention relates to electrical transmission lines and is particularly directed to electrical transmission lines using superconductor materials to transmit electrical energy.

PRIOR ART

It has long been known that, at temperatures approaching Absolute 0° K. many materials tend to lose resistance to the flow of electrical energy and, hence, become what are called "superconductors". Unfortunately, powerful refrigeration systems and strong vacuums are generally required in order to maintain the conductors at such low temperatures. These refrigeration and vacuum systems are expensive to operate and cannot easily be adapted for long distance applications, such as would be necessary for transmission lines carrying electrical energy from one city to another. More importantly, at such low temperatures, most materials also become extremely brittle and, consequently, cannot be bent or shaped, which further limits practical application of superconductor technology. Because of these disadvantages, superconductor technology has been primarily limited to theoretical discussions or laboratory experiments and little, if any, practical use has been made of this technology.

A typical prior art attempt to provide superconductor means for transmitting electrical energy is shown in U.S. Pat. No. 4,626,614, issued Dec. 2, 1986, to Susumu Shimamoto et al, which features a plurality of electrical conductors contained within a stainless steel tube filled with helium. However, stainless steel would be prohibitively expensive to use for long distance transmission lines. Furthermore, in order to permit superconductivity to exist in the conductors within the stainless steel tube, it would be necessary that the helium be cooled to near Absolute 0° F. which would make the system subject to all of the objections discussed above. Thus, none of the prior art superconductor transmission systems have been entirely satisfactory.

BRIEF SUMMARY AND OBJECTS OF INVENTION

These disadvantages of the prior art are overcome with the present invention and a superconductor transmission line is proposed which is capable of being shaped substantially as desired and which can be used to transmit electrical energy over significant distances to permit numerous practical applications of superconductor technology.

The advantages of the present invention are preferably attained by providing a superconductor transmission system comprising a plurality of ball members interspersed by mating members enclosed within at least one protective outer wrapping, with said ball members and said mating members being formed of material which is electrically conductive at superconductor temperatures and each having an axial opening extending therethrough to permits passage of a suitable coolant fluid, such as liquid helium.

Accordingly, it is an object of the present invention to provide an improved transmission system for electrical energy.

Another object of the present invention is to provide an improved transmission system for electrical energy which permits such energy to be transmitted with substantially no resistance.

A further object of the present invention is to provide an improved transmission system for electrical energy employing superconductors.

An additional object of the present invention is to provide a superconductor transmission system for electrical energy.

A specific object of the present invention is to provide an improved transmission system for electrical energy comprising a plurality of ball members interspersed by mating members enclosed within at least one protective outer wrapping, with said ball members and said mating members being formed of material which is electrically conductive at superconductor temperatures and each having an axial opening extending therethrough to permits passage of a suitable coolant fluid, such as liquid helium.

These and other objects and features of the present invention will be apparent from the following detailed description, taken with reference to the figures of the accompanying drawings.

DETAILED DESCRIPTION OF THE INVENTION

Figure 1:
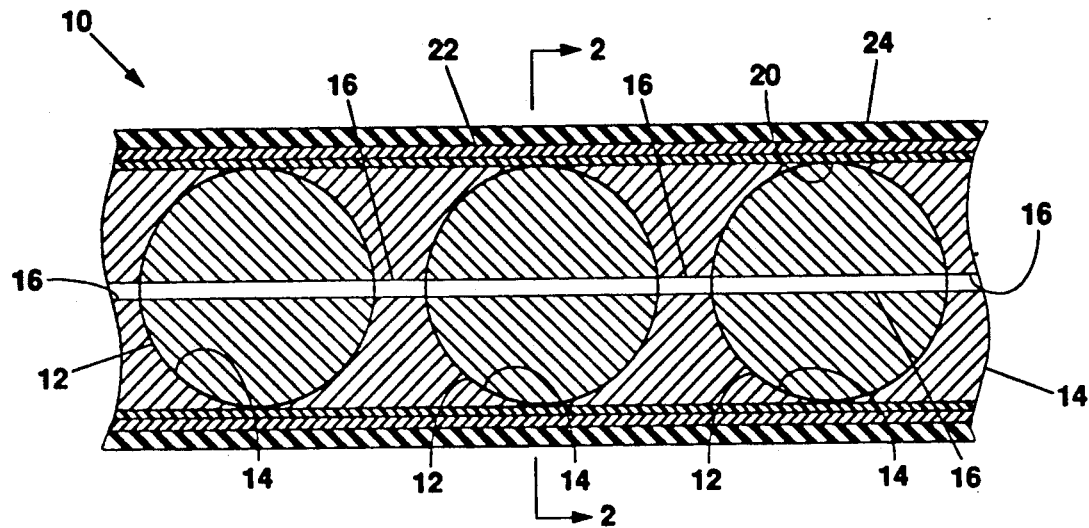
FIG. 1 is a vertical section through an electrical energy transmission line embodying the present invention.
Figure 2:
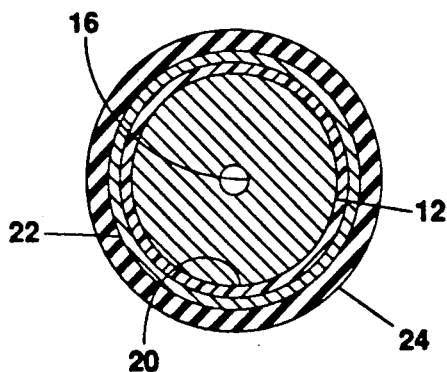
FIG. 2 is a transverse section of the transmission line of FIG. 1, taken on the line 2—2 of FIG. 1.

In that form of the present invention chosen for purposes of illustration in the drawing, FIG. 1 shows an electrical transmission line, indicated generally at 10, having a plurality of generating spherical ball members 12 with a plurality of mating members 14 interspersed between the ball members 12. The ball members 12 and mating members 14 are formed of material which is capable of conducting electrical energy at superconductor temperatures close to Absolute 0° K., such as metal or ceramic, and each of the ball members 12 and mating members 14 are formed with an opening 16 extending axially therethrough to permit passage of a suitable coolant fluid, such as liquid helium. As shown, the ball members 12 and mating members 14 are enclosed within a tube 20 of fluid-impervious material, such as a shrink-fit plastic, that forms an enclosing wall to retain the desired relationship of the ball members 12 and mating members 14 and to prevent fluid passage inward or outward through the tube 20. If desired, a strengthening pipe 22 formed of suitable material such as copper, silver or other appropriate metal, may be provided encircling the plastic tube 20 and, finally, a layer 24 of suitable insulating material may be wrapped about the pipe 22.

In use, the transmission line 10 may be made substantially any desired length by providing an assembly formed of an appropriate number of ball members 12 interspersed by a corresponding number of mating members 14, enclosed with a tube 20 of plastic which has been shrink-fit about the assembly of ball members 12 and mating members 14. Because the ball members 12 and mating members 14 are formed of electrically conductive material and are each in contact with an adjacent component, conventional means may be used to cause electrical energy to flow through the series of adjacent ball members 12 and mating members 14. Moreover, a source of coolant fluid, not shown, may be connected, using conventional techniques, to supply a flow of coolant fluid through the axial openings 16 to maintain the ball members 12 and mating members 14 at superconductive temperatures. If it is necessary or desirable to bend or otherwise shape the transmission line 10, each of the ball members 12 will have a slideable relationship with the adjacent mating members 14 and will function as a ball-and-socket joint to facilitate such bending or shaping. At the same time, the contact between the adjacent ball members 12 and mating members 14 assures that the assembly of ball members 12 and mating members 14 will function as a single continuous electrical conductor to transmit electrical energy between desired locations.

Figure 3:
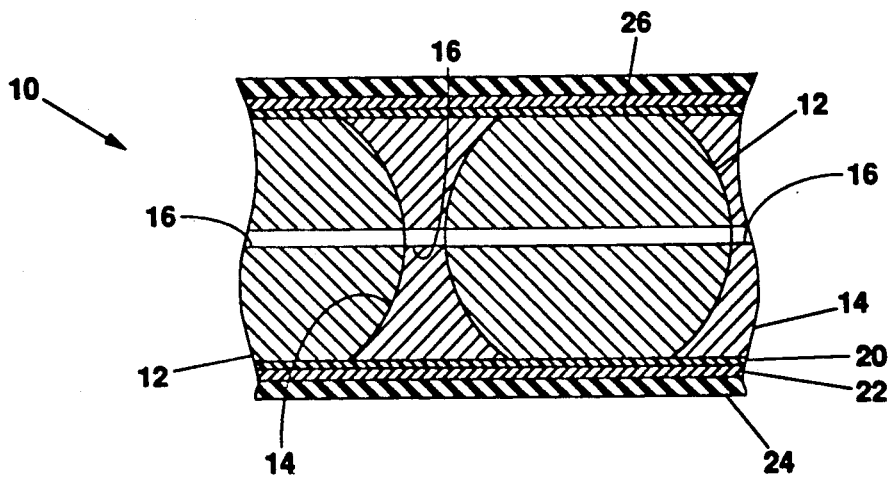
FIG. 3 is a view, similar to that of FIG. 1, showing an alterative form of ball member used with the transmission line of FIG. 1.

FIG. 3 shows an alternative form of the ball members 12 having an elongated, generally cylindrical, center portion 26. When the transmission line 10 includes relatively long stretches which require little or no bending, one or more of the ball members 26 of FIG. 3 may be substituted for the spherical ball members 12 of FIG. 1. This significantly reduces the number of components required to form a given length of the transmission line 10 and, hence, reduces the cost and complexity of assembly.

Obviously, if desired, numerous other variations and modifications may be made without departing from the spirit of the present invention. Therefore, if should be clearly understood that the forms of the present invention described above and shown in the figures of the accompanying drawing are illustrative only and are not intended to limit the scope of the present invention.

What is claimed is:

1. An electrical transmission line comprising:
   a plurality of ball members formed of electrically conductive material,
   a plurality of mating members formed of electrically conductive material and each interposed between and in contact with an adjacent pair of said ball members,
   each of said ball members and mating members being formed with an opening extending axially therethrough to permit passage of coolant fluid, and
   a tube of fluid impervious material shrink-fit about said plurality of ball members and mating members.

2. The transmission line of claim 1 wherein:
   said ball members and said mating members having sliding contact with adjacent members.

3. The transmission line of claim 1 further comprising:
   a quantity of coolant at superconductor temperatures flowing through said openings.

4. The transmission line of claim 1 wherein:
   at least one of said ball members is formed with an elongated generally cylindrical central portion.

* * * * *